(12) United States Patent
Kim

(10) Patent No.: US 9,266,527 B2
(45) Date of Patent: Feb. 23, 2016

(54) METHOD AND SYSTEM FOR SETTING MOTOR TORQUE FOR HYBRID VEHICLE

(71) Applicants: Hyundai Motor Company, Seoul (KR); Kia Motors Corporation, Seoul (KR)

(72) Inventor: Sang Joon Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 79 days.

(21) Appl. No.: 14/102,150

(22) Filed: Dec. 10, 2013

(65) Prior Publication Data

US 2014/0172214 A1 Jun. 19, 2014

(30) Foreign Application Priority Data

Dec. 18, 2012 (KR) .......................... 10-2012-0148810

(51) Int. Cl.
*B60L 11/00* (2006.01)
*G06F 7/00* (2006.01)
*B60W 20/00* (2006.01)
(Continued)

(52) U.S. Cl.
CPC .............. *B60W 20/10* (2013.01); *B60W 10/08* (2013.01); *B60W 10/26* (2013.01); *B60W 10/30* (2013.01); *B60K 2006/4825* (2013.01); *B60W 20/00* (2013.01); *B60W 20/1088* (2013.01); *B60W 2510/081* (2013.01); *B60W 2510/244* (2013.01); *B60W 2510/305* (2013.01); *B60W 2710/083* (2013.01); *B60W 2710/086* (2013.01);

(Continued)

(58) Field of Classification Search
CPC ......... B60K 2006/4825; B60W 10/26; B60W 2710/083; Y10S 903/906
USPC ..................................................... 701/22, 36
See application file for complete search history.

(56) References Cited

U.S. PATENT DOCUMENTS

| 5,453,930 A | * | 9/1995 | Imaseki | ................. | B60L 15/20 180/65.265 |
| 7,077,223 B2 | * | 7/2006 | Kubodera | ................ | B60K 6/44 180/65.225 |

(Continued)

FOREIGN PATENT DOCUMENTS

| JP | 3300304 B2 | 7/2002 |
| JP | 3746775 B2 | 12/2005 |

(Continued)

*Primary Examiner* — Khoi Tran
*Assistant Examiner* — Jorge Peche
(74) *Attorney, Agent, or Firm* — McDermott Will & Emery LLP

(57) ABSTRACT

A method and system for setting motor torque for a hybrid vehicle that converts charge or discharge limiting power of a battery into maximum charge or discharge torque of a motor to set motor torque and to protect a battery system of the hybrid vehicle may include obtaining maximum discharge power of a battery of the hybrid vehicle, power consumption of a low voltage DC-DC converter (LDC), and power consumption of electrical loads; calculating electrical discharge power that may be output by a motor with electric power based on the maximum discharge power, the power consumption of the LDC, and the power consumption of the electrical loads; calculating mechanical discharge power that may be output from the motor based on the electrical discharge power of the motor and discharge efficiency of the motor; and calculating maximum discharge torque of the motor at a determined speed based on the mechanical discharge power.

12 Claims, 7 Drawing Sheets

(51) Int. Cl.
  *B60W 10/08* (2006.01)
  *B60W 10/26* (2006.01)
  *B60W 10/30* (2006.01)
  *B60K 6/48* (2007.10)
(52) U.S. Cl.
  CPC .......... *Y02T10/6252* (2013.01); *Y02T 10/7258* (2013.01); *Y10S 903/906* (2013.01)

(56) References Cited

U.S. PATENT DOCUMENTS

| | | | | |
|---|---|---|---|---|
| 7,100,721 | B2* | 9/2006 | Atarashi | B60K 6/445 180/65.235 |
| 7,117,071 | B2* | 10/2006 | Aoki | B60L 11/1851 180/65.235 |
| 7,237,634 | B2* | 7/2007 | Severinsky | B60H 1/004 180/65.23 |
| 7,336,002 | B2* | 2/2008 | Kato | F02N 11/0866 307/10.6 |
| 7,587,263 | B2* | 9/2009 | Matsuda | B60K 6/44 318/139 |
| 8,250,864 | B2* | 8/2012 | Pott | B60K 6/48 180/65.1 |
| 2002/0123409 | A1* | 9/2002 | Suzuki | B60K 6/547 477/3 |
| 2003/0033060 | A1* | 2/2003 | Okoshi | B60K 6/365 701/22 |
| 2003/0034187 | A1* | 2/2003 | Hisada | B60K 6/445 180/65.1 |
| 2003/0094317 | A1* | 5/2003 | Takizawa | B60K 6/365 180/53.8 |
| 2004/0045751 | A1* | 3/2004 | Aoki | B60L 11/1851 180/65.235 |
| 2004/0162187 | A1* | 8/2004 | Suzuki | B60K 6/44 477/182 |
| 2005/0218876 | A1* | 10/2005 | Nino | H02M 3/1582 323/282 |
| 2006/0036357 | A1* | 2/2006 | Isono | B60K 6/48 701/22 |
| 2006/0138995 | A1* | 6/2006 | Sugita | B60K 6/44 318/811 |
| 2006/0232238 | A1* | 10/2006 | Horii | B60K 6/28 320/104 |
| 2007/0199747 | A1* | 8/2007 | Aoyagi | B60L 11/1861 180/65.31 |
| 2009/0314564 | A1* | 12/2009 | Okamura | B60K 6/547 180/65.285 |
| 2009/0325004 | A1* | 12/2009 | Choi | H01M 8/04626 429/431 |
| 2010/0121507 | A1* | 5/2010 | Ishii | B60K 6/445 701/22 |
| 2010/0286855 | A1* | 11/2010 | Yang | B60K 6/485 701/22 |
| 2010/0316922 | A1* | 12/2010 | Hamada | B60L 1/003 429/432 |
| 2011/0160947 | A1* | 6/2011 | Ideshio | B60K 6/387 701/22 |
| 2012/0059544 | A1* | 3/2012 | Kinoshita | B60G 17/0164 701/22 |
| 2012/0101675 | A1* | 4/2012 | Saito | B60L 15/10 701/22 |
| 2012/0101677 | A1* | 4/2012 | Ikegami | B60K 6/48 701/22 |
| 2012/0185143 | A1* | 7/2012 | Ohno | B60L 3/0061 701/99 |

FOREIGN PATENT DOCUMENTS

| | | |
|---|---|---|
| JP | 2011-189768 A | 9/2011 |
| KR | 10-2002-0049256 A | 6/2002 |
| KR | 10-2012-0012654 A | 2/2012 |
| KR | 10-1144614 B1 | 5/2012 |

* cited by examiner

METHOD AND SYSTEM FOR SETTING MOTOR TORQUE FOR HYBRID VEHICLE

CROSS-REFERENCE TO RELATED APPLICATION

This application claims benefit of priority to Korean Patent Application No. 10-2012-0148810 filed in the Korean Intellectual Property Office on Dec. 18, 2012, the entire contents of which are incorporated herein incorporated by reference.

TECHNICAL FIELD

The present disclosure relates to a method and system for setting motor torque for a hybrid vehicle, and more particularly, to a method and system for setting motor torque for a hybrid vehicle that converts charge or discharge limiting power of a battery into maximum charge or discharge torque of a motor to set motor torque, thereby protecting a battery system of the hybrid vehicle.

BACKGROUND

Hybrid vehicles are operated using power from an internal combustion engine and from a battery. In particular, hybrid vehicles are designed to efficiently combine and use power of the internal combustion engine and a motor.

For example, as illustrated in FIG. 1, a hybrid vehicle includes an engine 10, a motor 20, an engine clutch 30, a transmission 40, a differential gear 50, a battery 60, an integrated starter-generator (ISG) 70, and wheels 80. The engine clutch 30 controls power transmission between the engine 10 and the motor 20, and the integrated starter-generator (ISG) 70 starts the engine 10 or generates electric power by output torque of the engine 10.

As further shown, the hybrid vehicle includes: a hybrid control unit (HCU) 200 which controls overall operation of the hybrid electric vehicle; an engine control unit (ECU) 110 which controls operation of the engine 10; a motor control unit (MCU) 120 which controls operation of the motor 20; a transmission control unit (TCU) 140 which controls operation of the transmission 40; and a battery control unit (BCU) 160 which manages and controls the battery 60.

The battery control unit 160 may also be referred to as a battery management system (BMS). The integrated starter-generator 70 may also be referred to as a starting/generating motor or a hybrid starter-generator.

The hybrid vehicle may be operated in three different modes: a driving mode such as an electric vehicle (EV) mode solely using power of the motor 20; a hybrid electric vehicle (HEV) mode using torque of the engine 10 as main power and torque of the motor 20 as auxiliary power; and a regenerative braking (RB) mode while braking or when the vehicle runs by inertia. In the RB mode, braking and inertial energy are collected through power generation of the motor 20, and the battery 60 is charged with the collected energy.

When the hybrid vehicle runs, torque of the motor is set in order to satisfy driver's demand torque corresponding to the operation degree of an accelerator pedal, and then control to output the torque of the motor is performed.

However, when the output torque of the motor exceeds torque corresponding to charge or discharge limiting power of a battery, the battery may be over-charged or over-discharged, which may damage the battery, as illustrated in FIG. 2.

Accordingly, by considering a state of the battery, a scheme that sets a maximum or minimum torque limiting value not to exceed the charge or discharge limiting power value of the battery is requested.

The above information disclosed in this Background section is solely for enhancement of understanding of the background of the present disclosure and therefore it may contain information that does not form the prior art that is already known in this country to a person of ordinary skill in the art.

SUMMARY

The present disclosure is made in an effort to provide a method and system for setting motor torque for a hybrid vehicle having advantages of protecting a battery system by converting charge or discharge limiting power of a battery into maximum charge or discharge torque of a motor to set motor torque.

An embodiment of the present invention provides a method of setting motor torque for a hybrid vehicle, including: obtaining maximum discharge power of a battery of the hybrid vehicle, power consumption of a low voltage DC-DC converter (LDC) and power consumption of electrical loads; calculating electrical discharge power that may be output by a motor with electric power based on the maximum discharge power of the battery of the hybrid vehicle, the power consumption of the LDC, and the power consumption of the electrical loads; calculating mechanical discharge power that may be output from the motor based on the electrical discharge power of the motor and discharge efficiency of the motor; and calculating maximum discharge torque of the motor at a predetermined speed of the motor based on the mechanical discharge power.

The electrical loads include an air conditioner and a heater, and the electrical discharge power of the motor is calculated based on power determined by subtracting the power consumption of the LDC and the power consumption of the electrical loads from the maximum discharge power of the battery.

The maximum discharge torque of the motor is calculated by dividing the mechanical discharge power by the predetermined speed of the motor.

Another embodiment of the present invention provides a method of setting motor torque for a hybrid vehicle, including: obtaining maximum charge power of a battery of the hybrid vehicle, power consumption of a low voltage DC-DC converter (LDC), and power consumption of electrical loads; calculating electrical charge power that may be output by a motor with electric power based on the maximum charge power of the battery of the hybrid vehicle, the power consumption of the LDC, and the power consumption of the electrical loads; calculating mechanical charge power that may be output from the motor based on the electrical charge power of the motor and charge efficiency of the motor; and calculating maximum charge torque of the motor at the predetermined speed based on the mechanical charge power.

The electrical charge power of the motor is calculated based on power determined by subtracting the power consumption of the LDC and the power consumption of the electrical loads from the maximum charge power of the battery.

The maximum charge torque of the motor is calculated by dividing the mechanical charge power by the predetermined speed of the motor.

Yet another embodiment of the present invention provides a system for setting motor torque for a hybrid vehicle, including: a motor control unit (MCU) configured to control operation of a motor of the hybrid vehicle; a battery control unit (BCM) configured to control operation of a battery and a low voltage DC-DC converter (LDC) of the hybrid vehicle; and a motor torque setting unit configured to set the motor torque by converting discharge and charge limiting power of a battery into maximum discharge and charge torque corresponding to the discharge and charge limiting power of the battery.

The motor torque setting unit is operated by a predetermined program, and the predetermined program includes a series of commands for executing a method of setting motor torque including:

obtaining maximum discharge power of a battery of the hybrid vehicle, power consumption of a low voltage DC-DC converter (LDC), and power consumption of electrical loads; calculating electrical discharge power that may be output by a motor with electric power based on the maximum discharge power of the battery of the hybrid vehicle, the power consumption of the LDC, and the power consumption of the electrical loads; calculating mechanical discharge power that may be output from the motor based on the electrical discharge power of the motor and discharge efficiency of the motor; and calculating maximum discharge torque of the motor at a determined speed based on the mechanical discharge power, and obtaining maximum charge power of a battery of the hybrid vehicle, power consumption of a low voltage DC-DC converter (LDC), and power consumption of electrical loads; calculating electrical charge power that may be output by a motor with electric power based on the maximum charge power of the battery of the hybrid vehicle, the power consumption of the LDC, and the power consumption of the electrical loads; calculating mechanical charge power that may be output from the motor based on the electrical charge power of the motor and charge efficiency of the motor; and calculating maximum charge torque of the motor at a determined speed based on the mechanical charge power.

The motor torque setting unit includes: a first power addition-subtraction unit configured to subtract the power consumption of the LDC from the maximum discharge power of the battery or to add the power consumption of the LDC from the maximum charge power of the battery; a second power addition-subtraction unit configured to subtract the power consumption of the electrical loads from output power of the first power addition-subtraction unit or to add the power consumption of the electrical loads from the output power of the first power addition-subtraction unit; a power consumption calculating unit configured to calculate power consumption of the electrical loads; an electrical-mechanical power converting unit configured to convert electrical output power of the second power addition-subtraction unit into mechanical discharge and charge power of the motor based on discharge and charge efficiency of the motor; and a motor torque setting-performing unit configured to set maximum discharge and charge torque of the motor based on the mechanical discharge and charge power converted by the electrical-mechanical power converting unit, a determined speed of the motor, and maximum torque calculated by the MCU.

As described above, according to an embodiment of the present invention, it is possible to protect a battery system for a hybrid vehicle by converting charge or discharge limiting power of a battery into maximum charge or discharge torque of a motor to set motor torque.

DETAILED DESCRIPTION OF THE EMBODIMENTS

Figure 1:
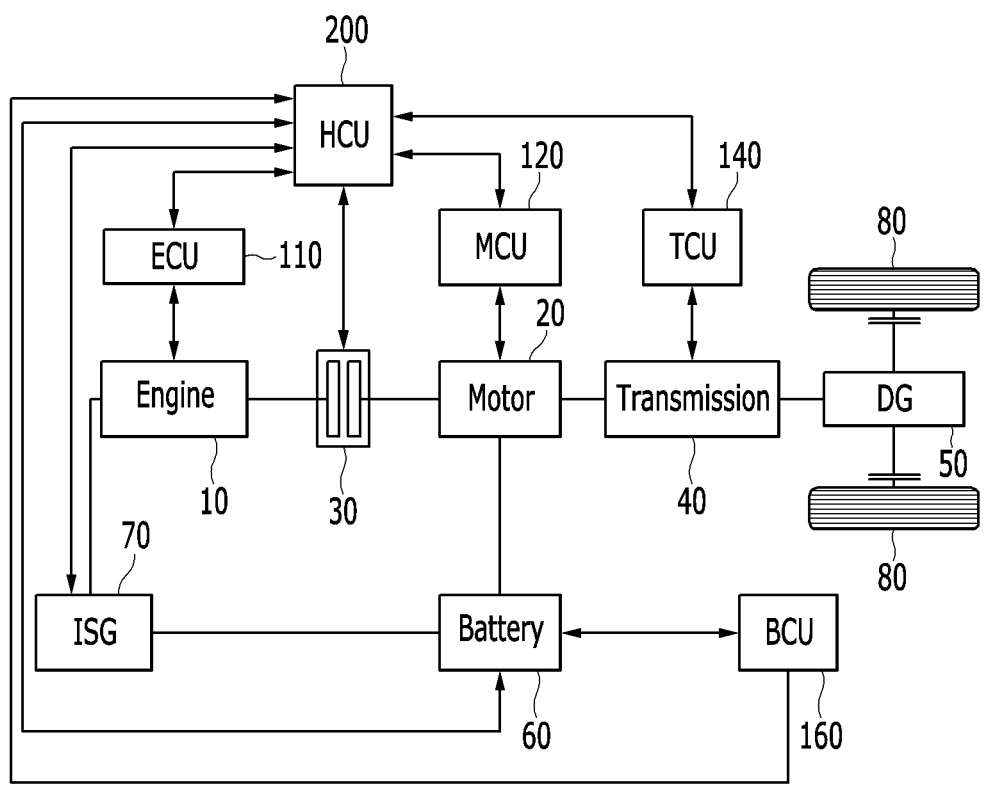
FIG. 1 is an exemplary block diagram illustrating a configuration of a typical hybrid vehicle.
Figure 2:
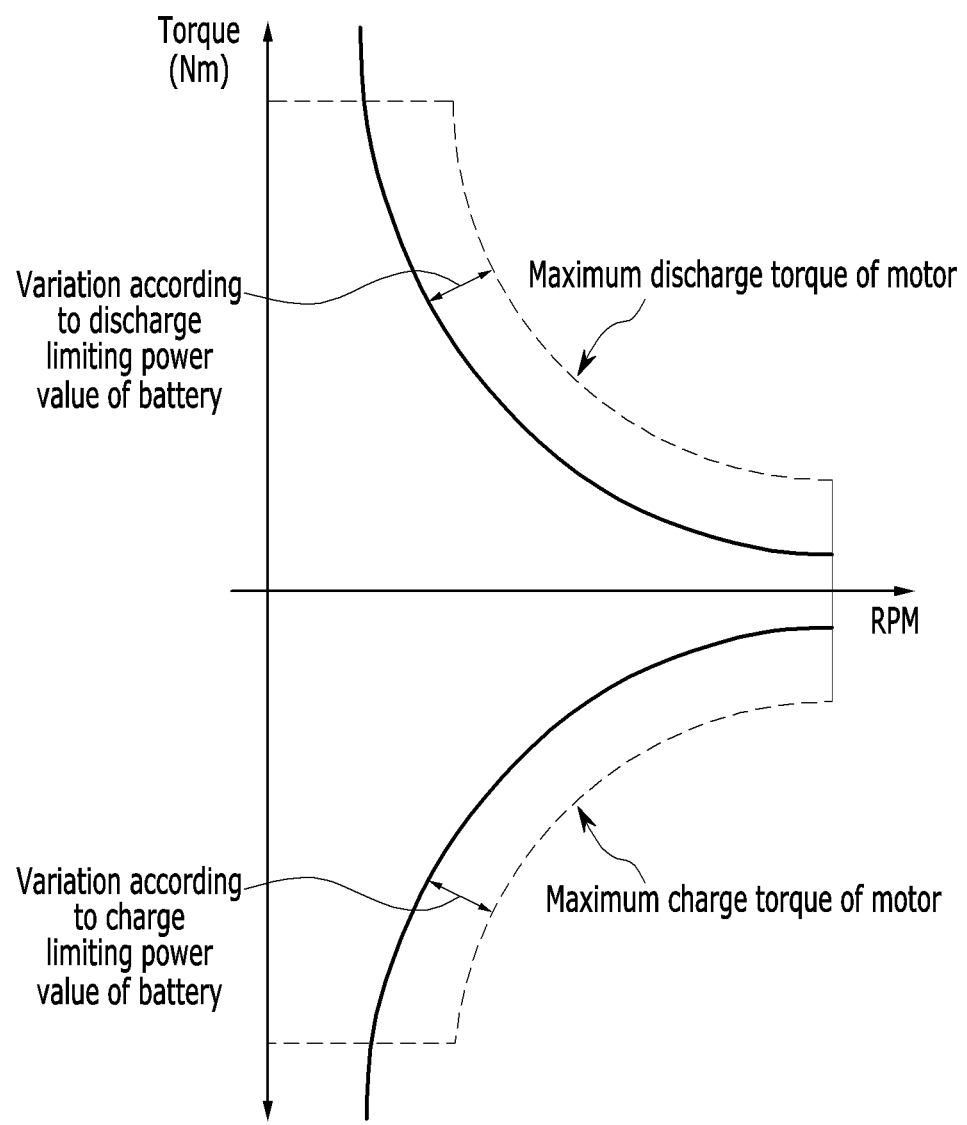
FIG. 2 is an exemplary graph illustrating a relation between a battery state and a motor torque of a typical hybrid vehicle.

Hereinafter, the present invention will be described more fully with reference to the accompanying drawings, in which embodiments of the invention are shown. As those skilled in the art would realize, the described embodiments may be modified in various different ways, all without departing from the spirit or scope of the present invention.

Further, throughout the specification, like reference numerals refer to like elements.

Figure 3:
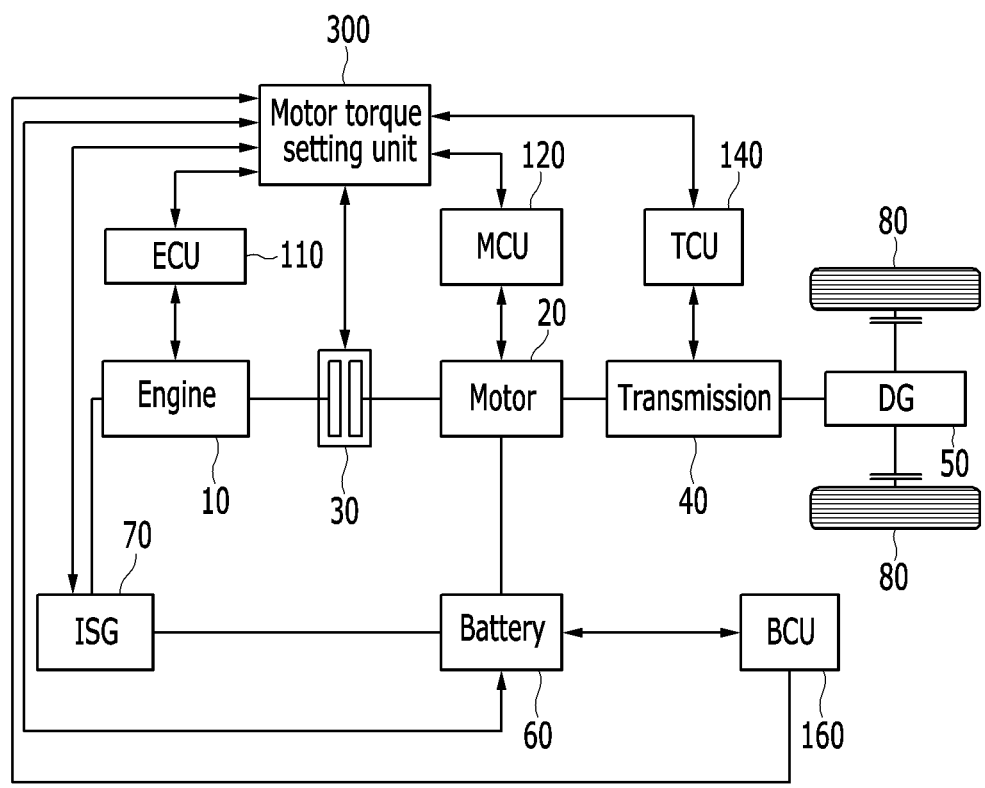
FIG. 3 is an exemplary configuration diagram of a system for setting motor torque for a hybrid vehicle according to an embodiment of the present invention.

FIG. 3 is an exemplary diagram configuration diagram of a system for setting motor torque for a hybrid vehicle according to an embodiment of the present invention.

As illustrated in FIG. 3, a system for setting motor torque for a hybrid vehicle according to an embodiment of the present invention includes an engine 10, a motor 20, an engine clutch 30, a transmission 40, a differential gear unit 50, a battery 60, an integrated starter-generator (ISG) 70, and wheels 80. The engine clutch 30 controls power transmission between the engine 10 and the motor 20, and the integrated starter-generator (ISG) 70 starts the engine 10 or generates electric power by output torque of the engine 10.

The system for setting the motor torque for the hybrid vehicle according to the embodiment of the present invention includes an engine control unit (ECU) 110 which controls operation of the engine 10; a motor control unit (MCU) 120 which controls operation of the motor 20; a transmission control unit (TCU) 140 which controls operation of the transmission 40; a battery control unit (BCU) 160 which manages and controls the battery 60; and a motor torque setting unit 300 which is configured to convert charge or discharge limiting power of the battery 60 into maximum charge or discharge torque of the motor 20 in order to set the motor torque.

The motor torque setting unit 300 may be made up of one or more processors or microprocessors and/or hardware operated by a program including a series of commands for executing a method of setting motor torque for a hybrid vehicle according to an embodiment of the present invention as described below.

Figure 4:
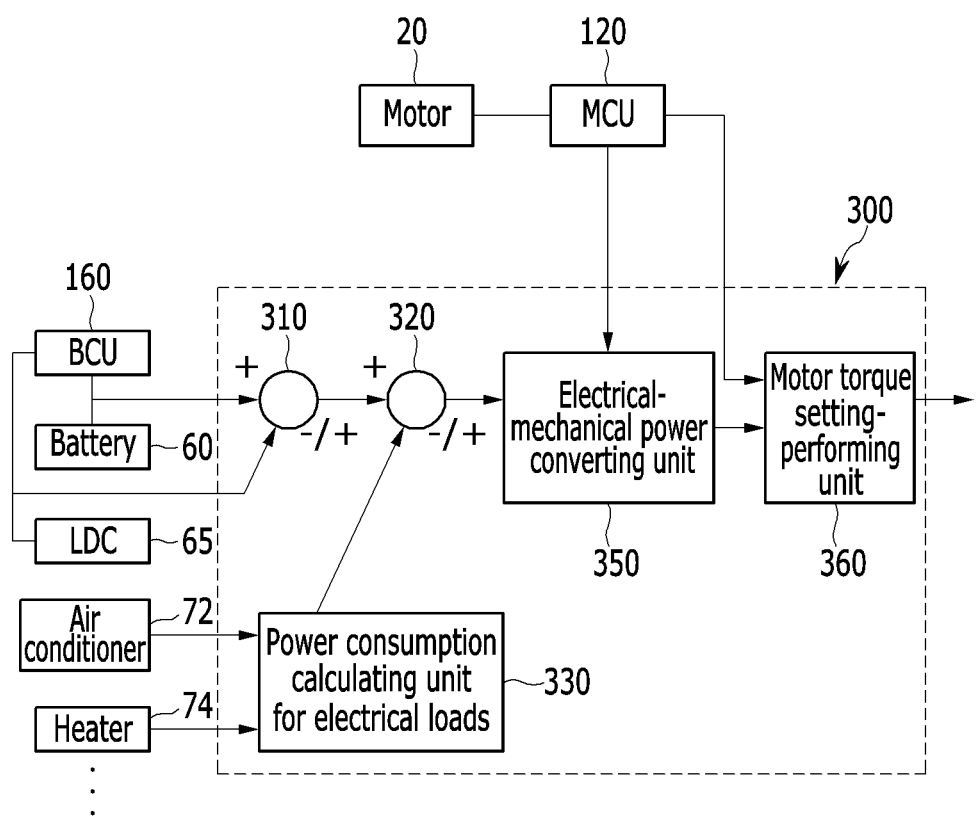
FIG. 4 is an exemplary diagram illustrating a motor torque control unit in FIG. 3 according to an exemplary embodiment of the present invention in detail.

As illustrated in FIG. 4, the motor torque setting unit 300 may include: a first power addition-subtraction unit 310 configured to subtract the power consumption of a low voltage DC-DC converter (LDC) 65 from the maximum discharge power of the battery 60 or to add the power consumption of the LDC 65 from the maximum charge power of the battery 60; a second power addition-subtraction device 320 configured to subtract the power consumption of electrical loads (e.g., an air conditioner and a heater) from output power of the first power addition-subtraction unit 310 or to add the power consumption of the electrical loads from the output power of the first power addition-subtraction unit 310; a power consumption calculating unit 330 configured to calculate power consumption of the electrical loads; an electrical-mechanical power converting unit 350 configured to convert electrical output power of the second power addition-subtraction unit 320 into mechanical discharge and charge power of the motor 20 based on discharge and charge efficiency of the motor 20; and a motor torque setting-performing unit 360 configured to set maximum discharge and charge torque of the motor 20 based on the mechanical discharge and charge power converted by the electrical-mechanical power converting unit 350, a determined speed of the motor 20, and maximum torque calculated by the MCU 120.

In the embodiment of the present invention, as one example, the motor torque setting unit 300 may include the MCU, the BCU, and the HCU, and as another example, the motor torque setting unit 300 may be included in the MCU, the BCU, or the HCU, but it should be understood that the scope of the present disclosure is not essentially limited thereto. Other configurations capable of substantially converting charge or discharge limiting power of the battery 60 into maximum charge or discharge torque of the motor 20 in order to set the motor torque may be used in the embodiment of the present invention.

In a method of setting motor torque for a hybrid vehicle according to an embodiment of the present invention which will be described below, some processes may be performed by the motor torque setting unit 300, and other processes may be performed by the MCU, the BCU, or the HCU.

However, it should be understood that the scope of the present disclosure is not limited to the exemplary embodiment to be described below. The motor torque setting unit 300 and other units may be implemented with a different combination from that described in the embodiment of the present invention. Otherwise, the motor torque setting unit 300, the MCU, the BCU, and the HCU may perform a different combination of processes from that described in the embodiment of the present invention.

Hereinafter, a method of setting motor torque for a hybrid vehicle according to an embodiment of the present invention will be described in detail with reference to the accompanying drawings.

Figure 5:
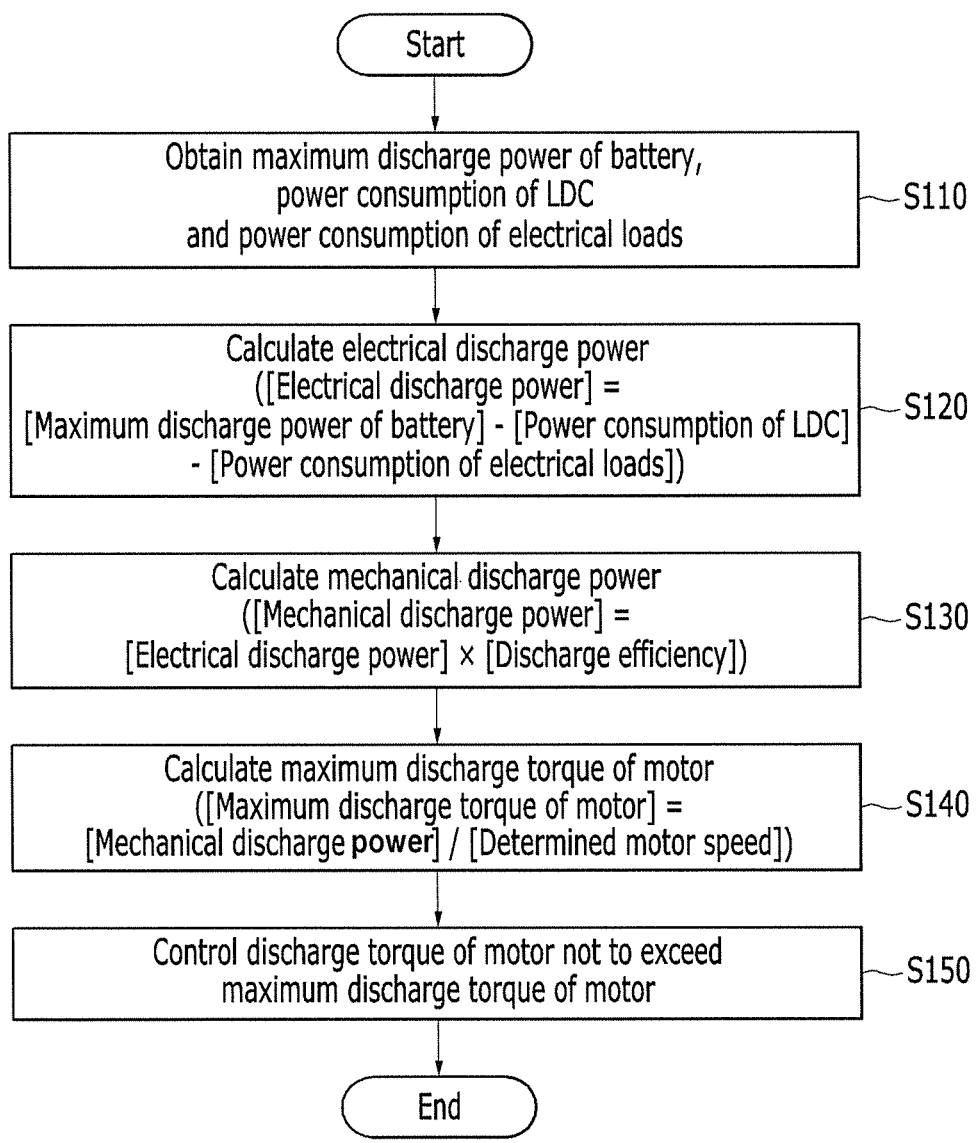
FIG. 5 and FIG. 6 are exemplary flowcharts of a method of setting motor torque for a hybrid vehicle according to an exemplary embodiment of the present invention.

FIG. 5 is an exemplary flowchart of a method of setting motor torque for a hybrid vehicle according to an embodiment of the present invention.

As illustrated in FIG. 5, the motor torque setting unit 300 obtains the maximum discharge power of the battery 60 of the hybrid vehicle, the power consumption of the low voltage DC-DC converter (LDC) 65, and the power consumption of the electrical loads at step S110.

The motor torque setting unit 300 may obtain the maximum discharge power of the battery 60 and the power consumption of the LDC 65 through the battery control unit (BCU) 160.

The electrical loads may include an air conditioner 72 and a heater 74. The motor torque setting unit 300 may obtain the power consumption of electrical loads, through the power consumption calculating unit 330 that may calculate power consumption of the air conditioner 72, the heater 74, and so on, as the electrical loads.

The power consumption calculating unit 330 may calculate the power consumption of the electrical loads by using a power consumption calculating method generally known in the related art.

When the maximum discharge power of the battery 60, the power consumption of the LDC 65, and the power consumption of the electrical loads are obtained at step S110, the motor torque setting unit 300 subtracts the power consumption of the LDC 65 and the power consumption of the electrical loads from the maximum discharge power of the battery 60 to calculate electrical power consumption (that is, electrical discharge power) that may be substantially consumed (discharged) through the first power addition-subtraction unit 310 and the second power addition-subtraction unit 320 at step S120.

The electrical discharge power is usable power that the motor 20 may consume (or discharge).

When the electrical discharge power is calculated at step S120, the motor torque setting unit 300 multiplies the electrical discharge power by discharge efficiency to calculate mechanical discharge power that the motor 20 may mechanically output through the electrical-mechanical power converting unit 350 at step S130.

The discharge efficiency may be easily obtained by a general test and the like according to the related art, which will be apparent to a person of ordinary skill in the art.

When the mechanical discharge power is calculated at step S130, the motor torque setting unit 300 divides the mechanical discharge power by corresponding speed in order to set the maximum discharge torque that the motor 20 may output by using power of the battery 60 at the corresponding speed, through the motor torque setting-performing unit 360 at step S140.

That power is obtained by multiplying torque by speed, which will be apparent to a person of ordinary skill in the art.

When setting the maximum discharge torque of the motor 20 at step S140, the motor torque setting-performing unit 360 compares the maximum discharge torque of the motor 20 with maximum torque of the motor 20 calculated by the MCU 120 such that the maximum discharge torque of the motor 20 does not exceed the maximum torque calculated by the MCU 120.

That is because, when being converted to mechanical torque, discharge torque exceeding the maximum torque calculated by the MCU 120 may be produced in a low-torque region and usable power is small in the low-speed region of torque curve of the motor 20.

As described above, when the maximum discharge torque of the motor 20 is set, the MCU 120 and so on may control the motor 20 not to exceed the maximum discharge torque at step S150.

Figure 7:
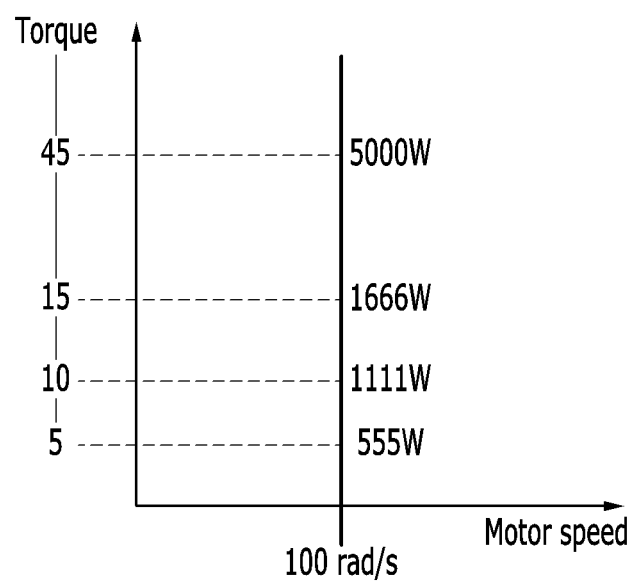
FIG. 7 is a graph for explaining a method of setting motor torque for a hybrid vehicle according to an embodiment of the present invention.

FIG. 7 is a graph for specifically explaining the method of setting the maximum discharge torque of the motor according to the embodiment of the present invention.

FIG. 7 is a graph assuming that speed of the motor 20 is 100 rad/s, electrical dischargeable power of the motor 20 is 5 kW, and discharge efficiency of the motor 20 is 0.9.

Referring to FIG. 7, when speed of the motor 20 is 100 rad/s and electrical dischargeable power of the motor 20 is 5 kW, maximum discharge torque of the motor 20 may be set at the motor speed 100 rad/s, as follows.

A torque value of a point at which power becomes 5 kW may be determined by calculating electrical torque of the motor 20 per each torque at the motor speed of 100 rad/s.

If discharge efficiency is 0.9 at a motor speed of 100 rad/s, because [5000=(maximum discharge torque)/(100/0.9)], maximum discharge torque become 45 Nm.

Figure 6:
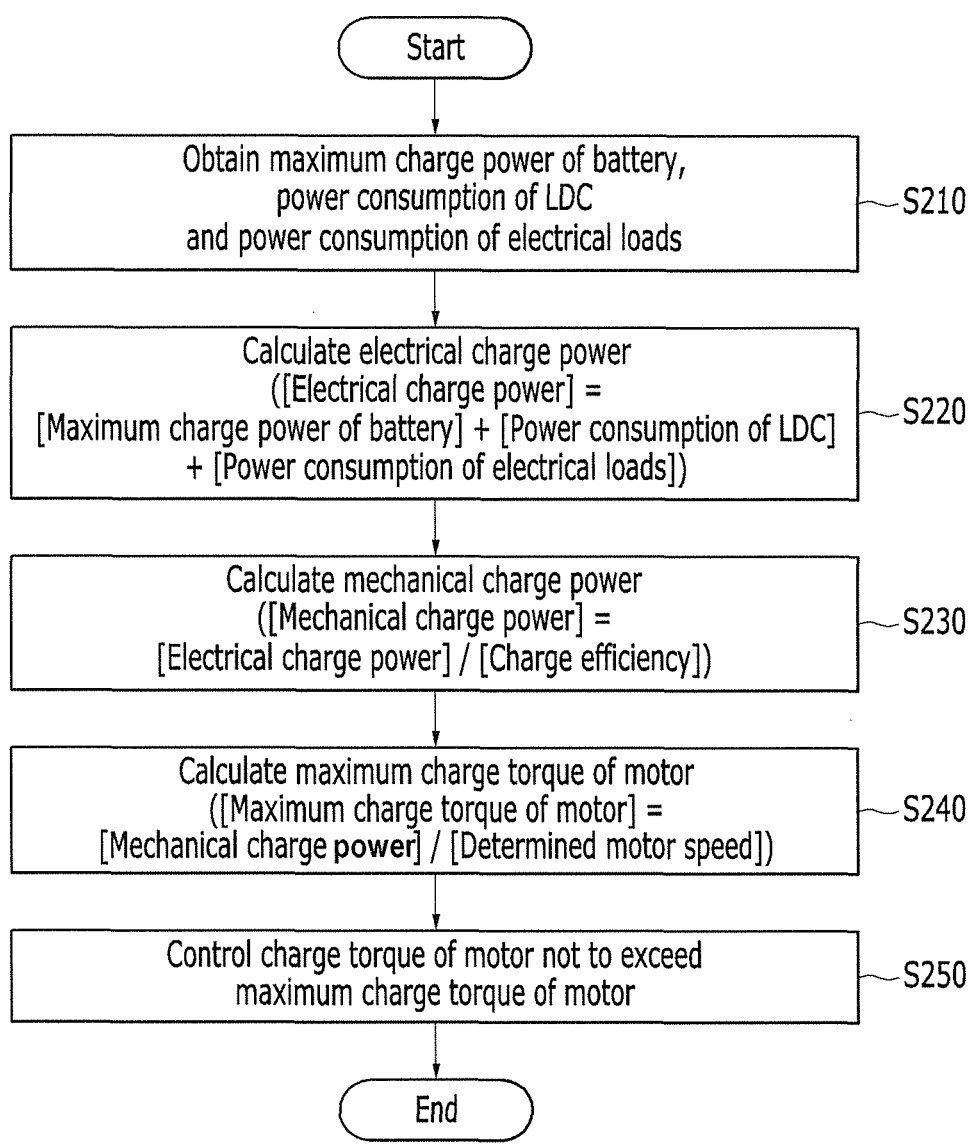

FIG. 6 is an exemplary flowchart of a method of setting motor torque for a hybrid vehicle according to another exemplary embodiment of the present invention.

As illustrated in FIG. 6, the motor torque setting unit 300 obtains the maximum charge power of the battery 60 of the hybrid vehicle, the power consumption of the low voltage DC-DC converter (LDC) 65, and the power consumption of the electrical loads at step S210.

The motor torque setting unit 300 may obtain the maximum charge power of the battery 60 and the power consumption of the LDC 65 through the battery control unit (BCU) 160.

The electrical loads may include an air conditioner 72 and a heater 74. The motor torque setting unit 300 may obtain the power consumption of electrical loads through the power consumption calculating unit 330 that may calculate power consumption of the air conditioner 72, the heater 74, and so on as the electrical loads.

The power consumption calculating unit 330 may calculate the power consumption of the electrical loads by using a power consumption calculating method generally known in the related art.

When the maximum charge power of the battery 60 at step S210, the power consumption of the LDC 65, and the power consumption of the electrical loads are obtained, the motor torque setting unit 300 adds the power consumption of the LDC 65 and the power consumption of the electrical loads to the maximum charge power of the battery 60 to calculate electrical charge power that the motor 20 may substantially charge, through the first power addition-subtraction unit 310 and the second power addition-subtraction unit 320, at step S220.

The electrical charge power is usable power that the motor 20 may charge to the battery 60, for example, with power generated through a regenerative braking (RB) mode.

When the electrical charge power is calculated at step S220, the motor torque setting unit 300 divides the electrical charge power by charge efficiency to calculate mechanical charge power that the motor 20 may mechanically output, through the electrical-mechanical power converting unit 350 at step S230.

(Electrical charge power)=(Mechanical charge power)×(Charge efficiency of the motor)

That the charge efficiency of the motor may be easily obtained by a general test and the like according to the related art will be apparent to a person of ordinary skill in the art.

When the mechanical charge power is calculated at step S230, the motor torque setting unit 300 divides the mechanical charge power by corresponding speed through the motor torque setting-performing unit 360 in order to set the maximum charge torque with which the motor 20 may charge the battery 60 at the corresponding speed, at step S240.

When setting the maximum charge torque of the motor 20 at step S240, the motor torque setting-performing unit 360 compares the maximum charge torque of the motor 20 with maximum torque of the motor 20 calculated by the MCU 120 in order that the maximum charge torque of the motor 20 does not exceed the maximum torque calculated by the MCU 120.

That is because, when being converted to mechanical torque, charge torque exceeding the maximum torque calculated by the MCU 120 may be produced in a low-torque region, and usable power is small in the low-speed region of the torque curve of the motor 20.

As described above, when the maximum charge torque of the motor 20 is set, the MCU 120 and so on may control the motor 20 not to exceed the maximum charge torque, at step S250.

Accordingly, according to embodiments of the present invention, it is possible to convert charge or discharge limiting power of a battery into maximum charge or discharge torque of a motor to set motor torque.

While the present disclosure has been described in connection with what is presently considered to be practical exemplary embodiments, it is to be understood that the present disclosure is not limited to the disclosed embodiments, but, on the contrary, is intended to cover various modifications and equivalent arrangements included within the spirit and scope of the appended claims.

What is claimed is:

1. A method of setting motor torque for a hybrid vehicle, comprising:

obtaining, by a motor torque setting unit, maximum discharge power of a battery of the hybrid vehicle, power consumption of a low voltage DC-DC converter (LDC), and power consumption of electrical loads;

calculating, by the motor torque setting unit, electrical discharge power that is consumed by a motor with electric power based on the maximum discharge power of the battery of the hybrid vehicle, the power consumption of the LDC, and the power consumption of the electrical loads;

calculating, by the motor torque setting unit, mechanical discharge power that is output from the motor based on the electrical discharge power of the motor and discharge efficiency of the motor;

calculating, by the motor torque setting unit, maximum discharge torque of the motor at a predetermined speed of the motor based on the mechanical discharge power; and setting, by the motor torque setting unit, a discharge torque of the motor not to exceed the maximum discharge torque of the motor.

2. The method of claim 1, wherein the electrical loads comprise an air conditioner electrical load and a heater electrical load, and the electrical discharge power of the motor is calculated based on power determined by subtracting the power consumption of the LDC and the power consumption of the electrical loads from the maximum discharge power of the battery.

3. The method of claim 1, wherein the maximum discharge torque of the motor is calculated by dividing the mechanical discharge power by the predetermined speed of the motor.

4. A method of setting motor torque for a hybrid vehicle, comprising:

obtaining, by a motor torque setting unit, maximum charge power of a battery of the hybrid vehicle, power consumption of a low voltage DC-DC converter (LDC), and power consumption of electrical loads;

calculating, by the motor torque setting unit, electrical charge power that is consumed by a motor with electric power based on the maximum charge power of the battery of the hybrid vehicle, the power consumption of the LDC, and the power consumption of the electrical loads;

calculating, by the motor torque setting unit, mechanical charge power that is output from the motor based on the electrical charge power of the motor and charge efficiency of the motor;

calculating, by the motor torque setting unit, maximum charge torque of the motor at a predetermined speed based on the mechanical charge power; and setting, by the motor torque setting unit, a charge torque of the motor not to exceed the maximum charge torque of the motor.

5. The method of claim 4, wherein the electrical charge power of the motor is calculated based on power determined by subtracting the power consumption of the LDC and the power consumption of the electrical loads from the maximum charge power of the battery.

6. The method of claim 4, wherein the maximum charge torque of the motor is calculated by dividing the mechanical charge power by the predetermined speed of the motor.

7. A system for setting motor torque for a hybrid vehicle, comprising:
- a motor control unit (MCU) configured to control operation of a motor of the hybrid vehicle;
- a battery control unit (BCM) configured to control operation of a battery and a low voltage DC-DC converter (LDC) of the hybrid vehicle; and
- a motor torque setting unit configured to set the motor torque by converting discharge and charge limiting power of a battery into maximum discharge and charge torque corresponding to the discharge and charge limiting power of the battery,
- wherein the motor torque setting unit is operated by a predetermined program, and the predetermined program includes a series of commands for executing a method of setting motor torque comprising:
- obtaining maximum discharge power of a battery of the hybrid vehicle, power consumption of a low voltage DC-DC converter (LDC), and power consumption of electrical loads; calculating electrical discharge power that is consumed by a motor with electric power based on the maximum discharge power of the battery of the hybrid vehicle, the power consumption of the LDC, and the power consumption of the electrical loads; calculating mechanical discharge power that is output from the motor based on the electrical discharge power of the motor and discharge efficiency of the motor; and calculating maximum discharge torque of the motor at a determined speed based on the mechanical discharge power, and
- obtaining maximum charge power of a battery of the hybrid vehicle, power consumption of a low voltage DC-DC converter (LDC), and power consumption of electrical loads; calculating electrical charge power that is output by a motor with electric power based on the maximum charge power of the battery of the hybrid vehicle, the power consumption of the LDC, and the power consumption of the electrical loads; calculating mechanical charge power that is output from the motor based on the electrical charge power of the motor and charge efficiency of the motor; and
- calculating maximum charge torque of the motor at a determined speed based on the mechanical charge power.

8. The system of claim 7, wherein the electrical loads comprise an air conditioner electrical load and a heater electrical load, and the electrical discharge power of the motor is calculated based on power determined by subtracting the power consumption of the LDC and the power consumption of the electrical loads from the maximum discharge power of the battery.

9. The system of claim 7, wherein the maximum discharge torque of the motor is calculated by dividing the mechanical discharge power by the determined speed of the motor.

10. The system of claim 7, wherein the electrical charge power of the motor is calculated based on power determined by subtracting the power consumption of the LDC and the power consumption of the electrical loads from the maximum charge power of the battery.

11. The system of claim 7, wherein the maximum charge torque of the motor is calculated by dividing the mechanical charge power by the determined speed of the motor.

12. The system of claim 7, wherein
the motor torque setting unit comprises:
- a first power addition-subtraction unit configured to subtract the power consumption of the LDC from the maximum discharge power of the battery or to add the power consumption of the LDC from the maximum charge power of the battery;
- a second power addition-subtraction unit configured to subtract the power consumption of the electrical loads from output power of the first power addition-subtraction unit or to add the power consumption of the electrical loads from the output power of the first power addition-subtraction unit;
- a power consumption calculating unit configured to calculate power consumption of the electrical loads;
- an electrical-mechanical power converting unit configured to convert electrical output power of the second power addition-subtraction unit into mechanical discharge and charge power of the motor based on discharge and charge efficiency of the motor; and
- a motor torque setting-performing unit configured to set maximum discharge and charge torque of the motor based on the mechanical discharge and charge power converted by the electrical-mechanical power converting unit, a determined speed of the motor, and maximum torque calculated by the MCU.

* * * * *